(12) United States Patent
Abe et al.

(10) Patent No.: US 7,895,180 B2
(45) Date of Patent: Feb. 22, 2011

(54) CONTENT FILTERING METHOD, APPARATUS THEREBY, AND RECORDING MEDIUM HAVING FILTERING PROGRAM RECORDED THEREON

(75) Inventors: Yuichi Abe, Tokyo (JP); Yoichiro Sako, Tokyo (JP); Itaru Kawakami, Kanagawa (JP); Mitsuru Takehara, Tokyo (JP); Takatoshi Nakamura, Ibaraki (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 11/977,312

(22) Filed: Oct. 24, 2007

(65) Prior Publication Data

US 2008/0177723 A1    Jul. 24, 2008

(30) Foreign Application Priority Data

Nov. 15, 2006    (JP) .............................. 2006-308594

(51) Int. Cl.
G06F 7/00    (2006.01)
G06F 17/30    (2006.01)

(52) U.S. Cl. ..................... 707/706; 707/754; 707/770

(58) Field of Classification Search ................ 707/706, 707/754, 770
See application file for complete search history.

(56) References Cited

U.S. PATENT DOCUMENTS

| | | | | |
|---|---|---|---|---|
| 6,868,189 | B1* | 3/2005 | Hoshino | 382/260 |
| 7,356,202 | B2* | 4/2008 | Hoshino | 382/303 |
| 7,506,979 | B2* | 3/2009 | Yamaguchi | 351/205 |
| 7,590,308 | B2* | 9/2009 | Hoshino | 382/302 |
| 2005/0117811 | A1* | 6/2005 | Hoshino | 382/260 |
| 2005/0163221 | A1* | 7/2005 | Oka et al. | 375/240.16 |
| 2005/0210145 | A1* | 9/2005 | Kim et al. | 709/231 |
| 2006/0059165 | A1* | 3/2006 | Bosloy et al. | 707/10 |
| 2006/0064716 | A1* | 3/2006 | Sull et al. | 725/37 |
| 2006/0155757 | A1* | 7/2006 | Williams et al. | 707/103 R |
| 2006/0184573 | A1* | 8/2006 | Koori | 707/104.1 |
| 2006/0264733 | A1* | 11/2006 | Masaki | 600/407 |
| 2007/0174302 | A1* | 7/2007 | Ishiguro et al. | 707/10 |

(Continued)

FOREIGN PATENT DOCUMENTS

CN    1804838 A    7/2006

(Continued)

OTHER PUBLICATIONS

Li et al.—"Techniques for Associateive Retrieval"—Stanford University, AFRL-IF-RS-2001-26—Mar. 2001 (pp. 1-34).*

(Continued)

*Primary Examiner*—John E Breene
*Assistant Examiner*—Anh Ly
(74) *Attorney, Agent, or Firm*—Wolf, Greenfield & Sacks, P.C.

(57) ABSTRACT

A content filtering method for selecting a desired piece of content from a plurality of pieces of content includes the steps of associating additional information about each piece of content and reduced image data representing the piece of content with the piece of content and registering the additional information and the reduced image data in a table; retrieving a piece of content having a highest level of coincidence with the additional information from the table by using the additional information corresponding to the reduced image data specified by a user as a search key; and presenting the reduced image data about the retrieved piece of content to the user.

11 Claims, 8 Drawing Sheets

ENTTBL   TABLE OF ENTRIES

| ENTRY ID | DATE | TITLE | ARTIST | NAME OF ENTRY FILE | NAME OF CONTENT FILE | TAGS |
|---|---|---|---|---|---|---|
| 0085 | 07/11/1974 | EXPERIENCE IN XXX | MARIAH GREEN | 0085.JPG | 0085.MP3 | MARIAH GREEN IDLE OLDIES 1974 |
| 0086 | 05/20/1975 | ZZZ BOY | JELLIES | 0086.JPG | 0086.AVI | JELLIES OLDIES XX YY ZZ |
| ..... | ..... | ..... | | ..... | ..... | ..... |
| | | | | | | |

U.S. PATENT DOCUMENTS

2008/0219595 A1* 9/2008 Hoshino ................. 382/303
2009/0285501 A1* 11/2009 Hoshino ................. 382/260

FOREIGN PATENT DOCUMENTS

JP          2002-334257     11/2002

OTHER PUBLICATIONS

Lee et al.—"Image Indexing and Similarity Retrieval Based on Key Objects"—Multimedia and Expo, 2004, ICME'04 2004 IEEE International Conference on Multimedia, vol. 2, dated Jun. 30, 2004 (pp. 819-822).*

Shardanand et al., Social Information Filtering: Algorithms for Automating "Word of Mouth", ACM CHI '95 Proceedings, 1995, http://acm.org/sigchi/chi95/electronic/documents/papers/us_bdy.htm.

* cited by examiner

CHRTBL  TABLE OF CHRONOLOGIES

| CHRONOLOGY ID | TITLE | ENTRY IDS |
|---|---|---|
| 0005 | PERSONAL HISTORY | 0066 0072 0077 0085 0089 0105 |
| 0014 | OLDIES | 0055 0056 0057 0205 0222 0231 |
| ..... | ..... | ..... |

FIG. 5

ENTTBL  TABLE OF ENTRIES

| ENTRY ID | DATE | TITLE | ARTIST | NAME OF ENTRY FILE | NAME OF CONTENT FILE | TAGS |
|---|---|---|---|---|---|---|
| 0085 | 07/11/1974 | EXPERIENCE IN XXX | MARIAH GREEN | 0085.JPG | 0085.MP3 | MARIAH GREEN IDLE OLDIES 1974 |
| 0086 | 05/20/1975 | ZZZ BOY | JELLIES | 0086.JPG | 0086.AVI | JELLIES OLDIES XX YY ZZ |
| ... | ... | ... | | | | ... |

CONTENT FILTERING METHOD, APPARATUS THEREBY, AND RECORDING MEDIUM HAVING FILTERING PROGRAM RECORDED THEREON

CROSS REFERENCES TO RELATED APPLICATIONS

The present invention contains subject matter related to Japanese Patent Application JP 2006-308594 filed in the Japanese Patent Office on Nov. 15, 2006, the entire contents of which are incorporated herein by reference.

BACKGROUND OF THE INVENTION

1. Field of the Invention

The present invention relates to a filtering method for retrieving a desired piece of content from many pieces of content, a filtering apparatus by the filtering method, and a recording medium having a filtering program recorded thereon.

2. Description of the Related Art

Widespread use of personal computers and broadband provides an increasing number of opportunities to view or browse many pieces of content to users. For example, it is possible to acquire content data about music, movies, dramas, and novels by using download services or through online shopping or to make use of Web pages or blogs publicized by personals or images photographed by personals with digital cameras by using personal computers.

However, an increase in the number of pieces of content makes difficult for the users to browse all the pieces of content. In addition, it is necessary to prepare a method of easily retrieving pieces of content desired by the users.

Under such circumstances, for example, the following methods are proposed:

(A) Collaborative Filtering

For example, when a book is purchased through online shopping, purchase histories of other users are utilized to introduce other books purchased by the users who purchased the book.

(B) Tag

Tag information is added to pieces of content. A tag added to a specified piece of content is used as a keyword to retrieve other pieces of content.

In the case of (A), users can find other related pieces of content (books) only by selecting a piece of content (a book to be purchased). In the case of (B), since the tag is used as a keyword, it is easy to determine why the other pieces of content are selected.

Documents in related art include, for example, Japanese Unexamined Patent Application Publication No. 2002-334257 and Upendra Shardanandand Pattie Maes, 1995, "Social Information Filtering: Algorithms for Automating Word of Mouth", ACM CHI'95 Proceedings.

SUMMARY OF THE INVENTION

However, in the case of (A), if a piece of content desired by the user is not selected, there is no method of retrying the selection, that is, there is no method of retrieving other pieces of content by trial and error. In addition, it is difficult to determine any correlation between a selected piece of content and what is selected.

In the case of (B), since the number of associated pieces of content is increased as the abstractness of a tag is increased, it is difficult to refine desired pieces of content. In addition, it is necessary to perform two steps: "selecting a piece of content" and "selecting a tag".

It is desirable to easily filter out (select) a desired piece of content from many pieces of content.

According to an embodiment of the present invention, a content filtering method for selecting a desired piece of content from a plurality of pieces of content includes the steps of associating additional information about each piece of content and reduced image data representing the piece of content with the piece of content and registering the additional information and the reduced image data in a table; retrieving a piece of content having a highest level of coincidence with the additional information from the table by using the additional information corresponding to the reduced image data specified by a user as a search key; and presenting the reduced image data about the retrieved piece of content to the user.

According to another embodiment of the present invention, a recording medium includes a computer-executable filtering program for selecting a desired piece of content from a plurality of pieces of content. The filtering program includes the steps of associating additional information about each piece of content and reduced image data representing the piece of content with the piece of content and registering the additional information and the reduced image data in a table; retrieving a piece of content having a highest level of coincidence with the additional information from the table by using the additional information corresponding to the reduced image data specified by a user as a search key; and presenting the reduced image data about the retrieved piece of content to the user.

According to another embodiment of the present invention, a content filtering apparatus for selecting a desired piece of content from a plurality of pieces of content includes registering means for associating additional information about each piece of content and reduced image data representing the piece of content with the piece of content and registering the additional information and the reduced image data in a table; retrieving means for retrieving a piece of content having a highest level of coincidence with the additional information from the table by using the additional information corresponding to the reduced image data specified by a user as a search key; and presenting means for presenting the reduced image data about the retrieved piece of content to the user.

According to the present invention, associated pieces of content are dynamically updated each time a new piece of content is selected. In addition, selecting an arbitrary piece of content from the updated pieces of content causes pieces of content associated with the selected piece of content to be dynamically updated.

BRIEF DESCRIPTION OF THE DRAWINGS

FIG. 3 shows an example of a display screen during editing according to an embodiment of the present invention;

FIG. 4 shows an example of a data table used in the embodiments of the present invention;

FIG. 5 shows another example of the data table used in the embodiments of the present invention;

DESCRIPTION OF THE PREFERRED EMBODIMENTS

In the following description, reduced images with which pieces of content, such as music, documents, motion pictures, or still images can be recalled are called "entries". For example, an embodiment of the present invention is realized in the following manner:

(1) Multiple pieces of content are displayed in a list including entries.
(2) The number of lists and the number of lists that are actually displayed are optional.
(3) The multiple lists can have arbitrary themes.
(4) During editing, an editing area is displayed.
(5) The entries can be edited in the editing area and in the multiple displayed lists. For example, the entries can be copied, deleted, moved, or added.
(6) For example, double-clicking an entry displays and plays back the pieces of content to which the entry is liked.

An example of a displayed list during browsing will now be described along with how to operate the displayed list. It is presumed that the list is a chronology in which multiple entries are arranged in time series. Arranging a user's background, music pieces which the user listened to, comics which the user read, things which the user purchased, affairs of memories, and so on in time series in the chronology can create the user's personal history reminiscent of old days.

The entries include, for example, reduced images of the jackets of music CDs, reduced images of leading characters and some scenes in comics, reduced images of purchased things, and reduced images of newspaper articles.

The chronology is processed by a personal computer owned by the user and is displayed in a display device of the personal computer. Data about displayed pieces of content may be stored in a external server or may be stored in the personal computer owned by the user.

Figure 1:
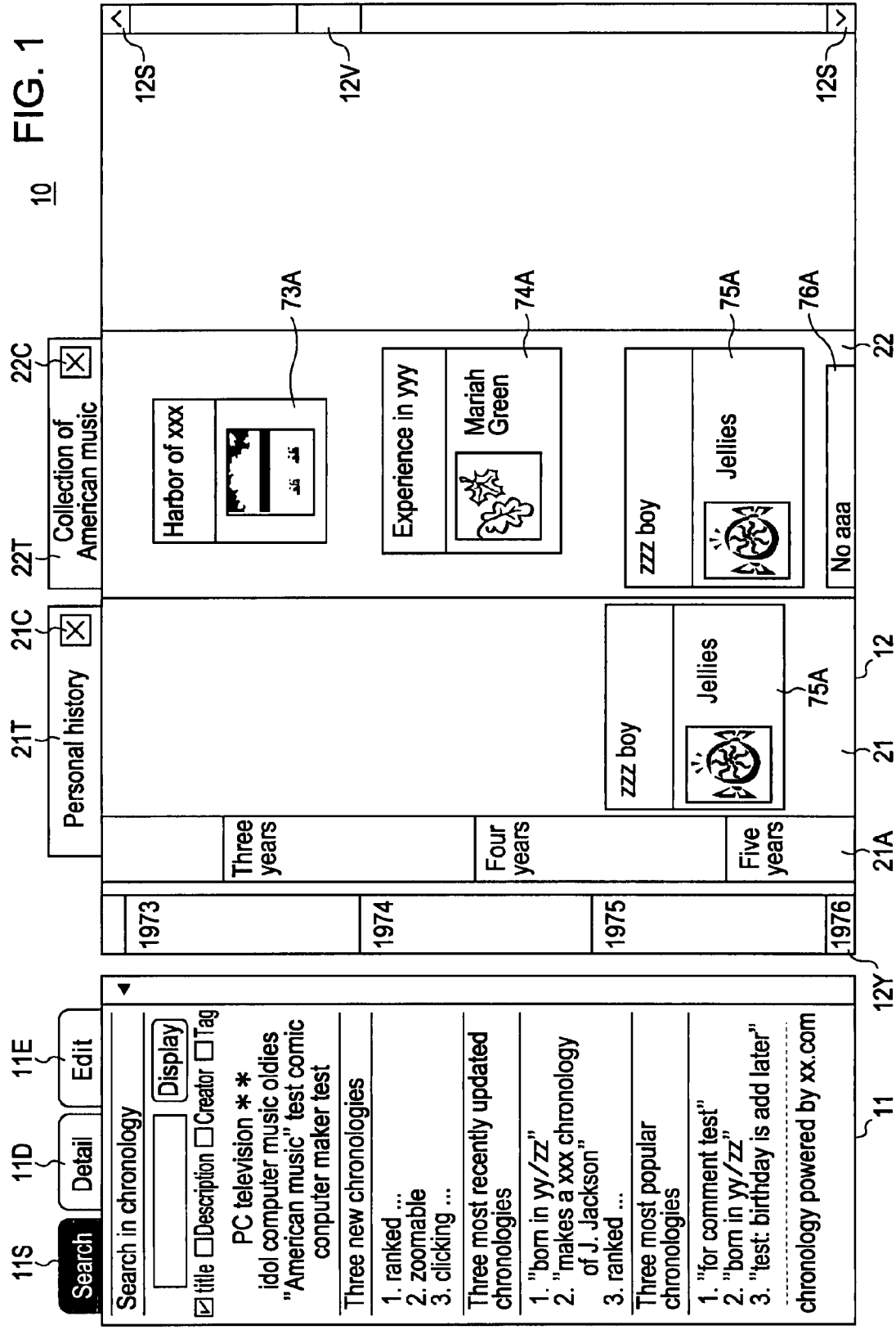
FIG. 1 shows an example of a display screen during browsing according to an embodiment of the present invention.

The chronology is displayed, for example, in a manner shown in FIG. 1. FIG. 1 shows an example of a chronology displayed in a display device of a user. A display screen 10 is divided into a left window (area) 11 and a right window (area) 12. For example, the right window 12 is about two times larger than the left window 11.

Referring to FIG. 1, a Search tab 11S, a Detailed tab 11D, and an Edit tab 11E are displayed at the top of the left window 11. The Search tab 11S, the Detailed tab 11D, and the Edit tab 11E are used for switching between modes. In the example shown in FIG. 1, the Search tab 11S is clicked with, for example, a mouse to be in a search mode. A menu and various input and selection items are displayed in the left window 11. A desired item can be input or selected from the items with the keyboard or mouse.

The chronology is displayed in the right window 12. Accordingly, a vertical numeric division bar (year bar) 12Y used for dividing the dates in units of years is displayed on the left side of the right window 12. In the example shown in FIG. 1, part of the year bar 12Y, from the middle of 1973 to the middle of 1976, is displayed.

A first chronology 21 including the entries (thumbnails) of pieces of content along a theme is displayed on the right side of the year bar 12Y. In the example shown in FIG. 1, the theme of the first chronology 21 is the personal history of the user and music pieces which were released or prevailed in each year in the year bar 12Y are displayed in the first chronology 21.

An age bar 21A is displayed on the left side of the first chronology 21. The age bar 21A is adjacent to the year bar 12Y and is parallel to the year bar 12Y. Ages of the user, from the middle of two year to the middle of five year, are displayed in the age bar 21A with reference to the date of birth of the user set in advance. The age bar 21A is associated with the divided years in the year bar 12Y. An entry 75A indicating a music piece (a piece of content) which was released at the time when the user was four years old is displayed near the "four year" in the age bar 21A. The entry 75A may be a reduced image of the jacket of a music CD on which the corresponding music piece is recorded.

A title 21T ("the personal history" in the example shown in FIG. 1) of the first chronology 21 and a Close (Clear) button 21C used for closing the first chronology 21 are displayed at the top of the first chronology 21.

A second chronology 22 is displayed on the right side of the first chronology 21. The second chronology 22 is displayed in a manner similar to that of the first chronology 21 (the age bar 21A is not displayed in the second chronology 22). Music pieces typical of each year are registered in the second chronology and the entries of the registered music pieces are displayed in the second chronology 22. Specifically, in the example shown in FIG. 1, an entry 73A indicating a hit tune in 1973 is displayed at a vertical position corresponding to "1973" in the year bar 12Y and an entry 74A indicating a hit tune in 1974 is displayed at a vertical position corresponding to "1974" in the year bar 12Y. The same applies to the subsequent years in the year bar 12Y.

A title 22T ("Collection of American music" in the example shown in FIG. 1) of the second chronology 22 and a Close (Clear) button 22C used for closing the second chronology 22 are displayed at the top of the second chronology 22.

The same applies to display of the third and subsequent chronologies. When the many chronologies are displayed, horizontal scrolling of the right window 12 allows the chronologies to be sequentially displayed in the right window 12.

A vertical scroll bar 12V and top and bottom scroll buttons 12S are displayed on the right side of the right window 12. Operating the vertical scroll bar 12V or the top and bottom scroll buttons 12S with the mouse allows the year bar 12Y and all the chronologies (the first chronology 21 and the second chronology 22 in the example shown in FIG. 1) to be vertically scrolled in synchronization with each other.

If an arbitrary entry in the entries displayed in the first chronology 21 or the second chronology 22 is double-clicked with the mouse, the piece of content corresponding to the entry is selected and played back. For example, if the entry 75A indicating a music piece is double-clicked, the music piece corresponding to the entry 75A is selected and played back.

The user may make the created chronologies public on a network. In such a case, the user can obtain a comment from another user or can compare the created chronology with the chronology created by another user (can display the chronology created by the other user at the position of the second chronology 22) to share memories with other users, thereby feeling a sense of nostalgia.

Figure 2:
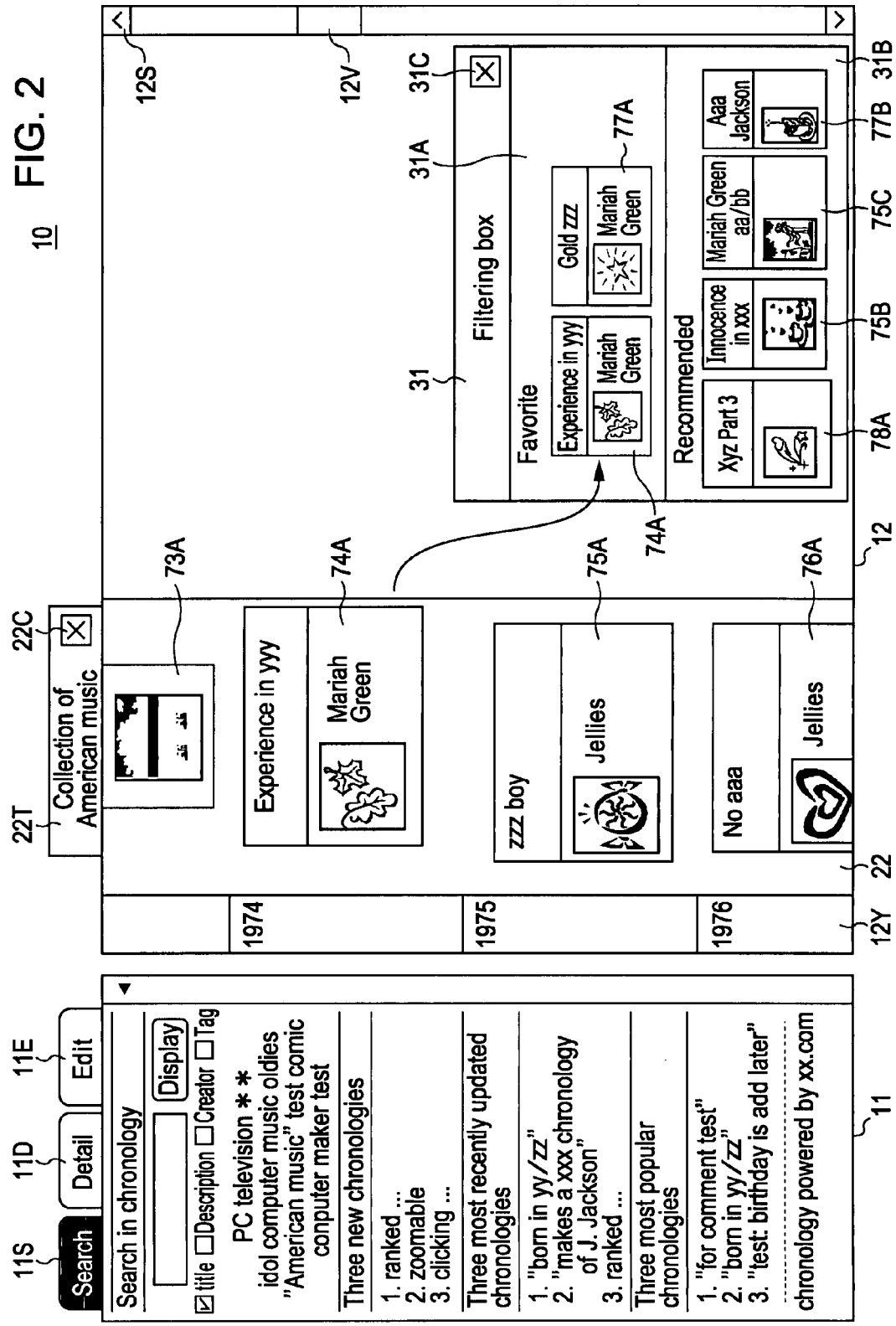
FIG. 2 shows an example of a display screen during filtering according to an embodiment of the present invention.

FIG. 2 shows an example of the display screen 10 when the pieces of content in the second chronology 22 are filtered out. Specifically, in the example shown in FIG. 2, the Close button 21C in the first chronology 21 is clicked in the display state in FIG. 1 to close the first chronology 21. As a result, the second chronology 22 is displayed at the position of the original first chronology 21. It is presumed that the content of the chronology 22 is available or is provided over the Internet or the like.

A filtering box 31 used for editing is displayed in a blank area in the right window 12. Although not shown, the filtering box 31 is displayed when [Filtering box] is selected from the menu or a filtering box iron is selected.

The filtering box 31 includes a Favorite area 31A and a Recommended area 31B. Any entry displayed in the chronology 22 can be registered (copied) in the Favorite area 31A. The registration is realized by right-clicking or dragging-and-dropping the entry with the mouse. In the example shown in FIG. 2, an entry 74A displayed in the chronology 22 and an entry 77A that is not within the display screen 10 in FIG. 2 are registered in the Favorite area 31A.

After the entries are registered in the Favorite area 31A, entries associated with the registered entries are determined on the basis of conditions described below and the determined new entries are registered in the Recommended area 31B. In the example shown in FIG. 2, since the entries 74A and 77A are registered in the Favorite area 31A, entries 78A, . . . , 77B associated with the entries 74A and 77A are registered in the Recommended area 31B.

Specifically, the entries of the pieces of content selected by the user are displayed in the Favorite area 31A. The pieces of content associated with the piece of content selected by the user are automatically selected and the entries of the selected pieces of content are displayed in the Recommended area 31B.

Any entry registered in the Favorite area 31A can be deleted at any time. The entries in the Recommended area 31B are also deleted in conjunction with the deletion of the entry registered in the Favorite area 31A. In other words, the entries in the Recommended area 31B are dynamically updated in conjunction with the entries in the Favorite area 31A.

Clicking a Close button 31C in the filtering box 31 with the mouse closes the filtering box 31 (clears the display of the filtering box 31). However, even if the display of the filtering box 31 is cleared, the information in the filtering box 31, that is, the entries in the filtering box 31 are held. Accordingly, it is possible for the user to browse the entries in multiple chronologies while checking them and to collectively add the entries to the chronologies later.

The user can collect favorite pieces of content with reference to the entries of the pieces of content. In addition, the pieces of content associated with the collected pieces of content are also automatically collected.

Since the entries in the Recommended area 31B are automatically updated, the user can refine the entries in the Recommended area 31B, that is, the recommended pieces of content or can delete unnecessary entries while the user sequentially adds new entries to the Favorite area 31A. The entries registered in the Favorite area 31A can be used in or added to the chronology 21 or 22 or a chronology newly created in a manner described below.

Figure 3:
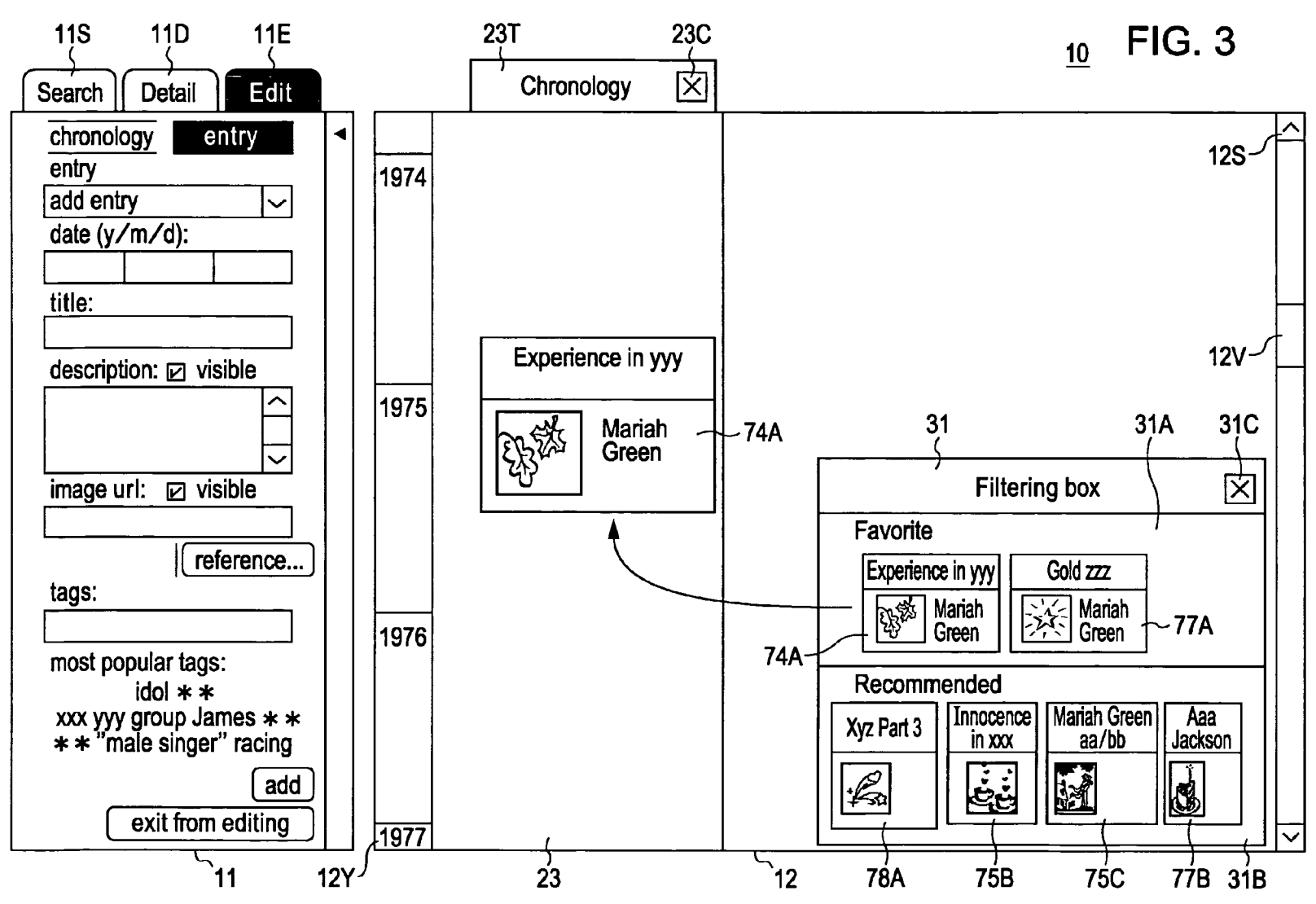

FIG. 3 shows how to create and edit a new chronology 23. In the creation of the chronology 23, the Edit tab 11E in the left window 11 is clicked with the mouse to be in an editing mode. A predetermined operation in the left window 11 displays the blank chronology 23 on the right side of the year bar 12Y in the right window 12, as shown in FIG. 3. Referring to FIG. 3, a reference symbol 23T denotes a title and a reference symbol 23C denotes a Close button.

A desired entry, among the entries displayed in the Favorite area 31A or the Recommended area 31B in the filtering box 31 displayed in response to the user's operation, is drag-and-dropped in the chronology 23. In the example shown in FIG. 3, the entry 74A registered in the Favorite area 31A is drag-and-dropped in the chronology 23 to copy the entry 74A to the chronology 23. The entry 74A is automatically displayed at the position corresponding to the associated year/date when the entry 74A is dropped (that is, the mouse button is released) regardless of where the entry 74A is dragged in the chronology 23. This is because each entry is displayed at the position corresponding to the associated year/date in the chronology by referring to "date" data associated with the entry, as described below.

A similar operation can be repeated to make the chronology 23 complete. Entries may be copied or moved from the existing first chronology 21 or second chronology 22 to the chronology 23 or may be copied or moved between the first chronology 21 and the second chronology 22.

When an entry in any of the first chronology 21, second chronology 22, and chronology 23 is added to the Favorite area 31A, the entries in the Recommended area 31B are also updated in accordance with the addition of the entry to the Favorite area 31A.

As described above, any entry displayed in the Favorite area 31A or the Recommended area 31B in the filtering box 31 can be easily add to either of the first chronology 21, the second chronology 22, or the chronology 23, thus saving the trouble of creating the chronology.

FIG. 4 shows an example of a data table, a table of chronologies CHRTBL, which the chronology (the first chronology 21, the second chronology 22, or the like) displayed in the window 12 has. The table of chronologies CHRTBL has one group for every chronology. Each group includes "Chronology ID", "Title", and "Entry IDs". One line in the table of chronologies CHRTBL corresponds to one chronology in the example shown in FIG. 4.

The "Chronology ID" is an identification code used for identifying a chronology. The "Title" denotes a chronology name given by the user. The "Entry IDs" are identification codes used for identifying the entries displayed in each chronology. The "Entry ID" will be described in detail below with reference to FIG. 5.

In the example shown in FIG. 4, the chronology in the first line has the "0005" as the "Chronology ID", "Personal History" as the "Title", and "0066, 0072, 0077, . . . " as the "Entry IDs". The chronology in the first line is displayed on the basis of the above information.

The table of chronologies CHRTBL may include a descriptive text describing the chronology in detail, a creator, an update time, a create time, and so on, in addition to the above data, for every chronology. The table of chronologies CHRTBL may be prepared in an external server.

FIG. 5 shows an example of a data table of entries, that is, a table of entries ENTTBL. The entries in a chronology serve as introductory parts for playing back (playing or displaying) desired pieces of content. The table of entries ENTTBL has one group for every entry. Each group includes "Entry ID", "Date", "Title", "Artist", "Name of entry file", "Name of content file", and "Tags". One line in the table of entries ENTTBL corresponds to one entry in the example shown in FIG. 5.

The "Entry ID" is an identification code used for identifying an entry and is used in, for example, the table of chronologies CHRTBL, as shown in FIG. 4. The "Date" indicates, for example, the date when the piece of content corresponding to the entry is sold. The "Title" indicates the name of the piece of content.

The "Artist" indicates a performer or creator of the piece of content. The "Name of entry file" indicates the name of an entry file (image file) displayed in the chronology or the filtering box 31. The "Name of content file" indicates the name of a content file corresponding to the entry and is used when the piece of content is selected and played back. When the piece of content is stored in a storage device in a filtering apparatus (personal computer), the name of the content file includes a path name and a file name. When the piece of content is supplied from, for example, an external server, the name the content file indicates a uniform resource locator (URL), which includes the type of information, a server name, a port number, a folder name, a file name, and so on.

The "Tags" indicates link information used for linking the entries in the Favorite area 31A in the filtering box 31 to the entries in the Recommended area 31B in the filtering box 31. Specifically, when an entry is registered in the Favorite area 31A, the "Tags" are used to select the entry corresponding to another piece of content associated with the piece of content of the registered entry and the selected entry is displayed in the Recommended area 31B. The information in the "Tags" may be automatically extracted from the "Date", "Title", or "Artist" described above or may be edited by the user to add a keyword or the like thereto.

The table of entries ENTTBL may include a descriptive text describing the entry in detail, an image, a motion picture, a sound, link information, and so on, in addition to the above data, for every entry. The table of entries ENTTBL may be prepared in an external server.

Figure 6:
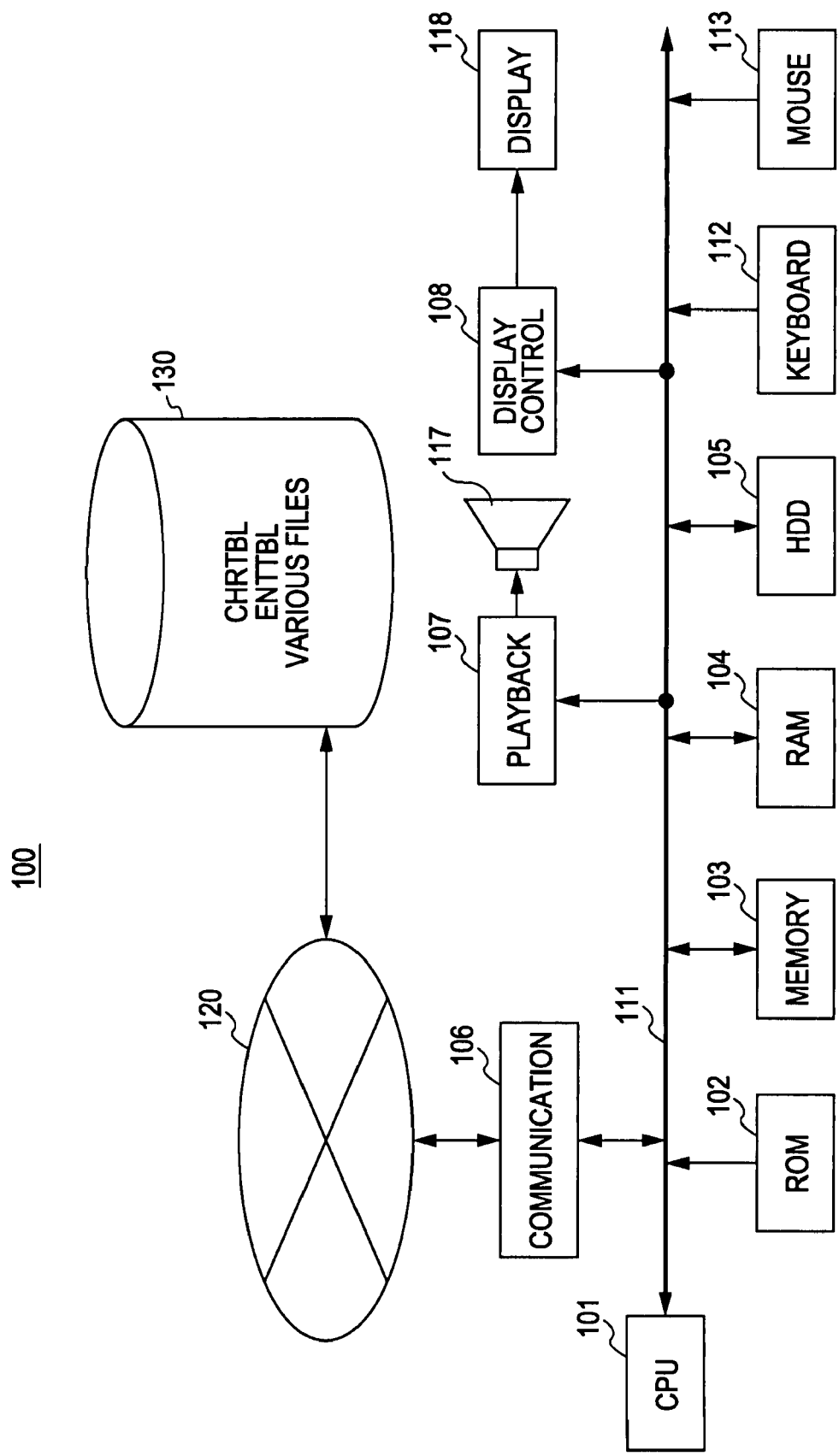
FIG. 6 shows an example of hardware configuration to which the embodiments of the present invention are applicable.

FIG. 6 shows an example of the hardware configuration of a personal computer 100 to which the embodiments of the present invention is applicable. The personal computer 100 has a configuration similar to that of a common personal computer. The personal computer 100 includes a central processing unit (CPU) 101, a read only memory (ROM) 102, a non-volatile memory 103, and a random access memory (RAM) 104.

The CPU 101 executes various programs. Basic Input/Output System (BIOS) and basic data executed by the CPU 101 are written in the ROM 102 and the non-volatile memory 103. The RAM 104 serves as a working memory when the CPU 101 executes the programs. The ROM 102, the non-volatile memory 103, and the RAM 104 are connected to the CPU 101 via a system bus 111.

A hard disk drive (HDD) 105 serving as a mass storage device is also connected to the system bus 111. The HDD 105 includes an operating system (OS) operating the personal computer 100 and programs realizing the processing described above.

A communication interface circuit 106 is further connected to the system bus 111. The personal computer 100 is connected to an external network 120, such as the Internet, via the communication interface circuit 106. A server 130, which stores the table of chronologies CHRTBL, the table of entries ENTTBL, and various files used by the table of chronologies CHRTBL and the table of entries ENTTBL, is connected to the network 120.

The personal computer 100 further includes an audio playback circuit 107 and a display control circuit 108, which are connected to the system bus 111. The audio playback circuit 107 performs decoding, for example, in a Moving Picture Experts Group (MPEG) Audio Layer-3 (MP3) format to digital audio data that is supplied, if necessary. The audio playback circuit 107, then, converts the digital audio data into an analog audio signal and supplies the analog audio signal to a speaker 117.

The display control circuit 108 includes a video RAM (not shown) to which display data is supplied. The display data is repeatedly read out at predetermined intervals and the readout display data is converted into a video signal. The video signal is supplied to a display 118 where an image is displayed. A keyboard 112 and a mouse 113 are connected to the system bus 111 as a character input device and a pointing device, respectively.

Figure 7:
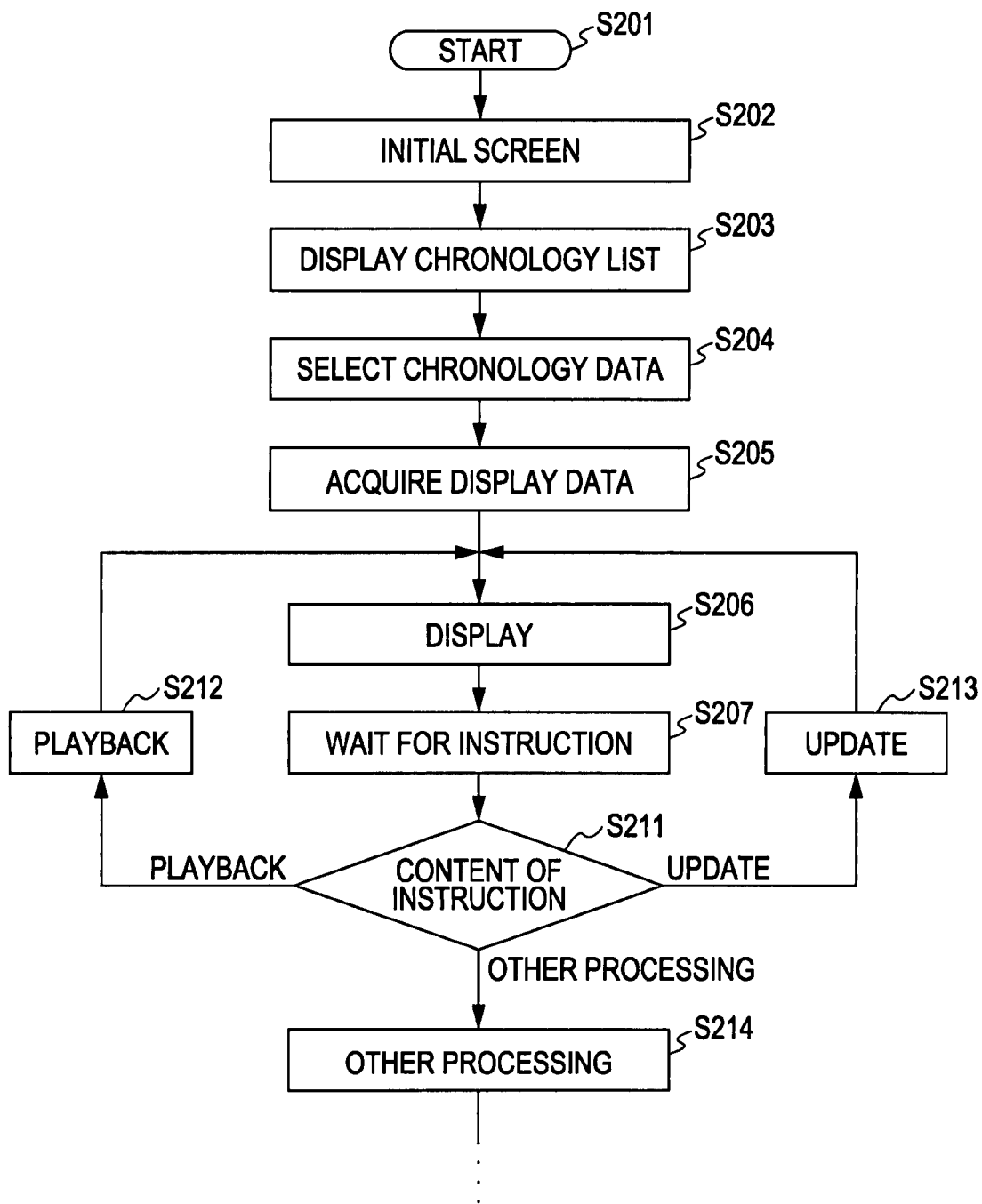
FIG. 7 is a flowchart showing an example of a routine according to an embodiment of the present invention.

FIG. 7 is a flowchart showing an example of a routine 200 for realizing display of a chronology in the window 12. The routine 200 is provided in the HDD 105. Only part of the routine 200 which is related to the embodiments of the present invention is shown in FIG. 7.

The routine 200 is executed in the following manner by the CPU 101. When the execution of the routine 200 is instructed with the keyboard 112 or the mouse 113, in Step S201, the CPU 101 starts the routine 200. In Step S202, the CPU 101 sets various initial settings to display an initial screen in the display 118. The window 12 in the initial screen may be blank or may be in the final state when the initial screen was previously used. The menu is displayed in the window 11 in the initial screen to wait for input of a processing mode by a user.

When the user selects display of the chronology on the menu, then in Step S203, the CPU 101 acquires data about the "Title" from the table of chronologies CHRTBL, displays the list of the titles of chronologies in the window 12 in accordance with the acquired data, and waits for selection of a chronology. When the user selects the title of a desired chronology from the list of the titles of the chronologies displayed in Step S203, then in Step S204, the CPU 101 selects all the entry IDs associated with the selected title from the table of chronologies CHRTBL.

In Step S205, the CPU 101 acquires the date, the title, the artist, the name of an entry file, the name of a content file, and the tags associated with each entry ID selected in Step S204 from the table of entries ENTTBL. In Step S206, the CPU 101 displays the chronology including the entries in accordance with the data acquired in Step S205. In Step S207, the CPU 101 waits for an instruction for the subsequent processing.

If the user double-clicks the entry in the state in which the chronology is displayed in Step S206, the CPU 101 goes from Step S207 to Step S211 to determine the content of the instruction in Step S207.

Since the entry is double-clicked in this case, the CPU 101 goes from Step S211 to Step S212. In Step S212, the CPU 101 selects the name of a content file associated with the entry ID of the double-clicked entry and plays back the piece of content, for example, a music piece, a motion picture, or a still image. The chronology is displayed in the manner described above. After the playback is terminated, the CPU 101 goes back to Step S206 to update the display screen and, then in Step S207, waits for an instruction for the subject processing.

If update is instructed when the CPU 101 waits for an instruction in Step S207, the CPU 101 goes from Step S211 to S213. In Step S213, the CPU 101 executes an update routine 300 described below to display the filtering box 31 with which filtering of the entries is performed. The CPU 101 updates the entries in the Recommended area 31B in accordance with the result of the filtering. If termination of the update is instructed, the CPU 101 goes back to Step S206 to update the display screen and, then in Step S207, waits for an instruction for the subject processing.

If another processing, for example, scrolling of the chronology or termination of the routine 200 is instructed when the CPU 101 waits for an instruction in Step S207, the CPU 101 goes from Step S211 to Step S214 to perform the instructed processing.

Figure 8:
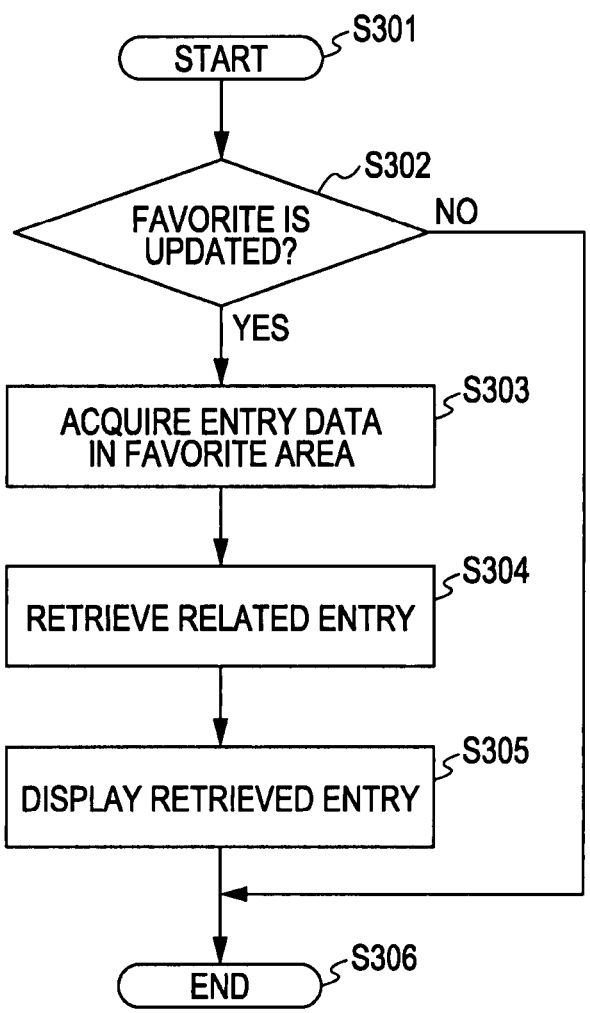
FIG. 8 is a flowchart showing an example of part of a routine according to an embodiment of the present invention.

FIG. 8 is a flowchart showing an example of the update routine 300 executed in Step S213. Referring to FIG. 8, in Step S301, the CPU 101 starts the update routine 300 after Step S211. In Step S302, the CPU 101 determines whether the content of the Favorite area 31A is updated. For example, the CPU 101 determines whether a new entry is registered in the Favorite area 31A or whether an existing entry is deleted from the Favorite area 31A. The CPU 101 may determine whether information concerning a registered entry is updated, for example, whether the "Tags" information concerning a registered entry is updated.

If the CPU 101 determines that the content of the Favorite area 31A is updated, then in Step S303, the CPU 101 acquires the entry ID of the entry newly registered in the Favorite area 31A from the table of entries ENTTBL.

Concurrently, the CPU 101 acquires other data concerning the entry from the table of entries ENTTBL on the basis of the acquired entry ID. Specifically, although the filtering can be performed by using only the tag information, also registering data about the "Title" and the "Date" allows entries having similar titles or entries having close dates to be retrieved.

In Step S304, the CPU 101 retrieves entry IDs having the tag information added to the entry ID acquired in Step S303 from the table of entries ENTTBL. Specifically, the CPU 101 retrieves entry IDs by using the tag information as a search key. Entries that have been already registered in the Favorite area 31A may be excluded from the retrieval. A target where entry IDs are retrieved may be set for every chronology, instead of the retrieval from the table of entries ENTTBL. For example, entry IDs may be retrieved from a displayed chronology or may be retrieved from a related chronology.

In Step S305, the CPU 101 displays the entries retrieved in Step S304 in the Recommended area 31B. The entries may be arranged in the order of the retrieval (in descending order of the level of coincidence) or may be arranged in units of chronologies to which the entries belong.

In Step S306, the CPU 101 terminates the update routine 300. If the CPU 101 determines in Step S302 that the content of the Favorite area 31A is not updated, the CPU 101 goes from Step S302 to Strep S306 to terminate the update routine 300.

The entries to be displayed in the Recommended area 31B are dynamically updated each time the entries registered in the Favorite area 31A are updated in the manner described above. As a result, the user can adjust the entries to be added to the Favorite area 31A while confirming the entries displayed in the Recommended area 31B to collect desired entries.

In the filtering box 31, the registration of an entry in the Favorite area 31A causes entries associated with the registered entry to be retrieved and the retrieved entries are registered in the Recommended area 31B. The registration can be realized by using the tags of each entry (entry ID) in FIG. 5.

For example, it is presumed that two entries ENT1 and ENT2 are registered in the Favorite area 31A and that the entries ENT1 and ENT2 have the following tags added thereto:

Entry ENT1: "Mariah Green" "idol" "oldies" "1974"
Entry ENT2: "Mariah Green" "idol" "American music"

Retrieval is performed on the basis of the following search conditions:

(1) AND Search

Entries having all the tags added to the entries ENT1 and ENT2, that is, entries having "Mariah Green", "idol", "oldies", "1974", and "American music" as the tags are valid.

(2) Common Search

Entries having tags common to the entries ENT1 and ENT2, that is, entries having "Mariah Green" and "idol" as the tags are valid.

(3) OR Search

Entries having any one of the tags added to the entries ENT1 and ENT2, that is, entries having any one of "Mariah Green", "idol", "oldies", "1974", and "American music" as the tag are valid.

Of the search conditions, (1) AND search has the toughest search conditions and (3) OR search has the easiest search conditions. Accordingly, for example, the search is performed in the following manner to register the valid entries in the Recommended area 31B:

(11) The AND search is performed. If any search result is yielded in the AND search, the yielded search result is registered in the Recommended area 31B.

(12) If the AND search achieve no valid entry, the common search is performed. If any search result is yielded in the common search, the yielded search result is registered in the Recommended area 31B.

(13) If the common search achieves no valid entry, the OR search is performed. If any search result is yielded in the OR search, the yielded search result is registered in the Recommended area 31B.

Alternatively, the search may be refined in the reverse order. Specifically, the search may be performed in the following manner to register the valid entries in the Recommended area 31B:

(21) The OR search is performed. If an appropriate number of search results are achieved in the OR search, the search results are registered in the Recommended area 31B.

(22) If too many search results are achieved in the OR search, the common search is performed. If an appropriate number of search results are achieved in the common search, the search results are registered in the Recommended area 31B.

(23) If too many search results are achieved in the common search, the AND search is performed. If an appropriate number of search results are achieved in the AND search, the search results are registered in the Recommended area 31B.

Alternatively, the user may select either of the AND search, the common search, or the OR search.

According to the embodiments of the present invention, only performing the operation "registration of entries in the Favorite area 31A" allows candidates for entries to be browsed to be automatically displayed in the Recommended area 31B, so that the user can easily obtain desired entries.

The information in the Recommended area 31B is dynamically updated in response to a user's operation. Accordingly, if the candidates are excessively refined, some entries can be removed from the Favorite area 31A to increase the number of candidates displayed in the Recommended area 31B. If the user wants to refine the candidates, entries can be added to the Favorite area 31A to reduce the number of candidates displayed in the Recommended area 31B.

Since only selecting the entry allows the information in the Recommended area 31B to be updated, it is not necessary for the user to select tags added to the entry and to be conscious of the tags.

Since an entry can be registered in the Favorite area 31A in response to a user's operation, it is sufficient for the user to mark interested entries during browsing. During editing, the user can collectively add only desired entries to the chronology, among the marked entries.

Although only the routine 200 and the update routine 300 realizing the embodiments of the present invention are provided in the personal computer 100 in the above description, part of the data, for example, pieces of content having higher playback frequencies may be stored in the personal computer 100.

The chronology is exemplified in the above description, for example, alphabetic characters are displayed in the vertical axis of the window 12 and entries, such as affairs, may be classified on the basis of the initial letters of the entries.

It should be understood by those skilled in the art that various modifications, combinations, sub-combinations and alterations may occur depending on design requirements and other factors insofar as they are within the scope of the appended claims or the equivalents thereof.

What is claimed is:

1. A content filtering method for selecting a desired piece of content from a plurality of pieces of content, the method comprising the steps of:
    associating, with at least one processor, each piece of content of the plurality of pieces of content with a piece of additional information about the piece of content and a piece of reduced image data representing the piece of content and registering the piece of additional information and the piece of reduced image data for each piece of content of the plurality of pieces of content in a table of entries for the plurality of pieces of content, wherein each entry in the table of entries includes an identification code that identifies the entry, wherein the piece of additional information includes link information and at least one of date information, title information, and artist information, wherein the link information is automatically extracted from the at least one of date information, title information and artist information;
    determining a search key based, at least in part, on the piece of additional information stored in the table of entries that is associated with a piece of content corresponding to a piece of reduced image data specified by a user;
    retrieving from the table based, at least in part, on the search key, the piece of reduced image data associated with the desired piece of content; and
    presenting the piece of reduced image data associated with the desired piece of content to the user.

2. The content filtering method according to claim 1, wherein the user specifies a plurality of pieces of reduced image data, and
    wherein any retrieval result satisfying all the pieces of additional information corresponding to the plurality of pieces of reduced image data is selected.

3. The content filtering method according to claim 1, wherein the user specifies a plurality of pieces of reduced image data, and
    wherein any retrieval result satisfying pieces of additional information common to the plurality of pieces of reduced image data is selected.

4. The content filtering method according to claim 1, wherein the user specifies a plurality of pieces of reduced image data, and
    wherein any retrieval result satisfying at least one piece of additional information in the pieces of additional information corresponding to the plurality of pieces of reduced image data is selected.

5. The content filtering method according to claim 1, wherein the piece of additional information includes date information associated with the corresponding piece of content, and
    wherein the pieces of reduced image data corresponding to the plurality of pieces of content are sorted based on the date information to display the sorted pieces of reduced image data, and pieces of reduced image data used for the retrieval are specified among the displayed sorted pieces of reduced image data.

6. The method of claim 1, wherein the link information includes at least one keyword added by a user.

7. A recording medium including a computer-executable filtering program for selecting a desired piece of content from a plurality of pieces of content, the filtering program comprising the steps of:
    associating each piece of content of the plurality of pieces of content with a piece of additional information about the piece of content and a piece of reduced image data representing the piece of content and registering the piece of additional information and the piece of reduced image data for each piece of content of the plurality of pieces of content in a table of entries for the plurality of pieces of content, wherein each entry in the table of entries includes an identification code that identifies the entry;
    determining a search key based, at least in part, on the piece of additional information stored in the table of entries that is associated with a piece of content corresponding to a piece of reduced image data specified by a user;
    retrieving from the table based, at least in part, on the search key, the piece of reduced image data associated with the desired piece of content; and
    presenting the piece of reduced image data associated with the desired piece of content to the user;
    wherein the piece of additional information includes date information associated with the corresponding piece of content, and
    wherein the pieces of reduced image data corresponding to the plurality of pieces of content are sorted based on the date information to display the sorted pieces of reduced image data, and pieces of reduced image data used for the retrieval are specified among the displayed sorted pieces of reduced image data.

8. The recording medium of claim 7, wherein the piece of additional information comprises at least one of date information, title information, and artist information.

9. The recoding medium of claim 8, wherein the piece of additional information comprises link information, wherein the filtering program further includes a step of:
    automatically extracting the link information from the at least one of the date information, the title information, and the artist information.

10. A content filtering apparatus for selecting a desired piece of content from a plurality of pieces of content, the apparatus comprising:
    registering means for associating each piece of content of the plurality of pieces of content with a piece of additional information about the piece of content and a piece of reduced image data representing the piece of content and registering the piece of additional information and the piece of reduced image data for each piece of content of the plurality of pieces of content in a table of entries for the plurality of pieces of content, wherein each entry in the table of entries includes an identification code that identifies the entry, wherein the piece of additional information includes link information and at least one of date information, title information, and artist information, wherein the link information is automatically extracted from the at least one of the date information, the title information and the artist information;
    determining means for determining a search key based, at least in part, on the piece of additional information stored in the table of entries that is associated with a piece of content corresponding to a piece of reduced image data specified by a user;

retrieving means for retrieving from the table based, at least in part, on the search key, the piece of reduced image data associated with the desired piece of content; and presenting means for presenting the piece of reduced image data associated with the desired piece of content to the user.

11. A content filtering apparatus for selecting a desired piece of content from a plurality of pieces of content, the apparatus comprising:

a registering unit that associates each piece of content of the plurality of pieces of content with a piece of additional information about the piece of content and a piece of reduced image data representing the piece of content and registers the additional information and the reduced image data in a table of entries for the plurality of pieces of content, wherein each entry in the table of entries includes an identification code that identifies the entry, wherein the piece of additional information includes link information and at least one of date information, title information, and artist information, wherein the link information is automatically extracted from the at least one of the date information, the title information and the artist information;

a determining unit that determines a search key based, at least in part, on the piece of additional information stored in the table of entries that is associated with a piece of content corresponding to a piece of reduced image data specified by a user;

a retrieving unit that retrieves from the table based, at least in part, on the search key, the piece of reduced image data associated with the desired piece of content; and a presenting unit that presents the piece of reduced image data associated with the desired piece of content to the user.

\* \* \* \* \*